(12) United States Patent
Baldwin et al.

(10) Patent No.: US 9,965,455 B2
(45) Date of Patent: May 8, 2018

(54) PREVIEWING INLINE AUTHORING OF WEB CONTENT

(71) Applicant: International Business Machines Corporation, Armonk, NY (US)

(72) Inventors: Nicholas A. Baldwin, Gladesville (AU); Mark C. Hampton, Fitzroy North (AU); Stefan A. Hepper, Morgan Hill, CA (US); Eric Martinez de Morentin, Manly (AU)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 14/607,208

(22) Filed: Jan. 28, 2015

(65) Prior Publication Data

US 2016/0034428 A1  Feb. 4, 2016

Related U.S. Application Data

(63) Continuation of application No. 14/445,192, filed on Jul. 29, 2014.

(51) Int. Cl.
  *G06F 17/24*  (2006.01)
  *G06F 17/30*  (2006.01)
  *H04L 29/08*  (2006.01)

(52) U.S. Cl.
  CPC ............ *G06F 17/24* (2013.01); *G06F 17/248* (2013.01); *G06F 17/30893* (2013.01); *H04L 67/02* (2013.01)

(58) Field of Classification Search
  CPC .................................................. G06F 17/30893
  See application file for complete search history.

(56) References Cited

U.S. PATENT DOCUMENTS

| 8,555,159 | B1 | 10/2013 | Shmulevich et al. | |
|---|---|---|---|---|
| 2002/0156813 | A1* | 10/2002 | Gardner | G06F 17/2247 715/234 |
| 2003/0050927 | A1* | 3/2003 | Hussam | G06F 17/30696 |

(Continued)

OTHER PUBLICATIONS

Liang et al., SeeSS: Seeing What I Broke—Visualizing Change Impact of Cascading Style Sheets (CSS), (Oct. 8-11, 2013).*

(Continued)

*Primary Examiner* — Keith Bloomquist
*Assistant Examiner* — Shahid Khan
(74) *Attorney, Agent, or Firm* — Daniel R. Simek

(57) ABSTRACT

In a method for managing modifications to elements of a website, receiving one or more modifications to an element of a first webpage, wherein the first webpage is a member of a website. The method further includes determining one or more webpages that include one or more instances of the modified element of the first webpage, wherein the determined one or more webpages are members of the website. The method further includes mapping a location for each of the one or more instances of the modified element within a respective webpage of the determined one or more webpages. The method further includes rendering at least a portion of the determined one or more webpages, wherein the rendered portion of the determined one or more webpages includes the location of the corresponding instance of the modified element.

7 Claims, 4 Drawing Sheets

(56) References Cited

U.S. PATENT DOCUMENTS

| | | | |
|---|---|---|---|
| 2003/0115365 A1* | 6/2003 | Lindsey | G06F 17/3061 709/246 |
| 2006/0242578 A1* | 10/2006 | Van Steenbergen | G06F 17/24 715/700 |
| 2008/0018928 A1 | 1/2008 | Meziani et al. | |
| 2009/0083641 A1 | 3/2009 | Christy | |
| 2009/0164300 A1* | 6/2009 | Gupta | G06Q 30/02 705/14.64 |
| 2009/0327101 A1 | 12/2009 | Sayed | |
| 2010/0199197 A1* | 8/2010 | Faletski | G06F 17/30905 715/760 |
| 2010/0251143 A1 | 9/2010 | Thomas et al. | |
| 2011/0320964 A1 | 12/2011 | Gambhir et al. | |
| 2013/0019189 A1 | 1/2013 | Stewart et al. | |
| 2013/0262986 A1 | 10/2013 | Leblond et al. | |
| 2013/0298047 A1 | 11/2013 | Buehler et al. | |
| 2014/0019848 A1 | 1/2014 | Le Bescond de Coatpont et al. | |
| 2014/0055495 A1 | 2/2014 | Kim et al. | |

OTHER PUBLICATIONS

"Inline editing with the enhanced site preview in WebSphere Commerce", YouTube, published on May 25, 2013, < http://www.youtube.com/watch?v=0LerEZc12no>.

"WCM portlets in Portal 8.0", YouTube, published on Jun. 19, 2012, <http://www.youtube.com/watch?v=vGa1zJm2tBE>.

List of IBM Patents or Patent Applications Treated as Related, dated Jan. 27, 2015.

Nicholas A. Baldwin, et al., "Previewing Inline Authoring of Web Content", U.S. Appl. No. 14/445,192, filed Jul. 29, 2014.

Liang, et al., SeeSS: Seeing What I Broke—Visualizing Change Impact of Cascading Style Sheets (CSS), Oct. 8-11, 2013, pp. 353-356.

* cited by examiner

PREVIEWING INLINE AUTHORING OF WEB CONTENT

BACKGROUND OF THE INVENTION

The present invention relates generally to the field of webpage software, and more particularly to a Web content management system (Web CMS) for webpages and websites.

A content management system (e.g., a Web CMS) may include the ability to identify and deliver the appropriate presentation for web content that a visitor of the associated website/webpage has requested. A Web CMS may allow publishing, editing, and modifications to website content, as well as maintenance from a central interface. Such systems of content management provide procedures to manage workflow in a collaborative environment. Websites can utilize several different views of the same content (e.g., depending on the visitor's location and context within the website). For example, the home page of a news website may have top news stories displayed in a manner to grab a visitor's attention, such as an image, a headline, and then a summary or the start of the news item itself. In the example, if the visitor navigates deeper into the website, the same article may appear (often in multiple places) in a more succinct manner (e.g., within lists or indexes of content for that particular section/topic/category). In the example, the same news article may simply be listed with a title and short description, or just a title. If the visitor selects that news item, the visitor may be taken to a webpage where the individual article is displayed in full.

The different webpages may show similar content, but each webpage may display different views of the same content (e.g., displaying a subset of the elements that make up the full article, in other cases additional elements not part of the original article are incorporated). The control of the elements included in different views of a website content may be accomplished within web content management systems by modeling the different types of content items or elements by developing multiple "views" or presentation templates (e.g., directly writing HTML code or a server-side scripts like JSP, which may produce HTML) that may be applied to each content type. Multiple presentation templates may then be created to dynamically present the various views required for each content type (e.g., a news article may require a feature view, a summary view, a short link view, and a full view).

SUMMARY

Aspects of the present invention disclose a method, a computer program product, and a system for managing modifications to elements of a website. The method includes one or more processors receiving one or more modifications to an element of a first webpage, wherein the first webpage is a member of a website. The method further includes one or more processors determining one or more webpages that include one or more instances of the modified element of the first webpage, wherein the determined one or more webpages are members of the website. The method further includes one or more processors mapping a location for each of the one or more instances of the modified element within a respective webpage of the determined one or more webpages. The method further includes one or more processors rendering at least a portion of the determined one or more webpages, wherein the rendered portion of the determined one or more webpages includes the location of the corresponding instance of the modified element.

DETAILED DESCRIPTION

Figure 1:
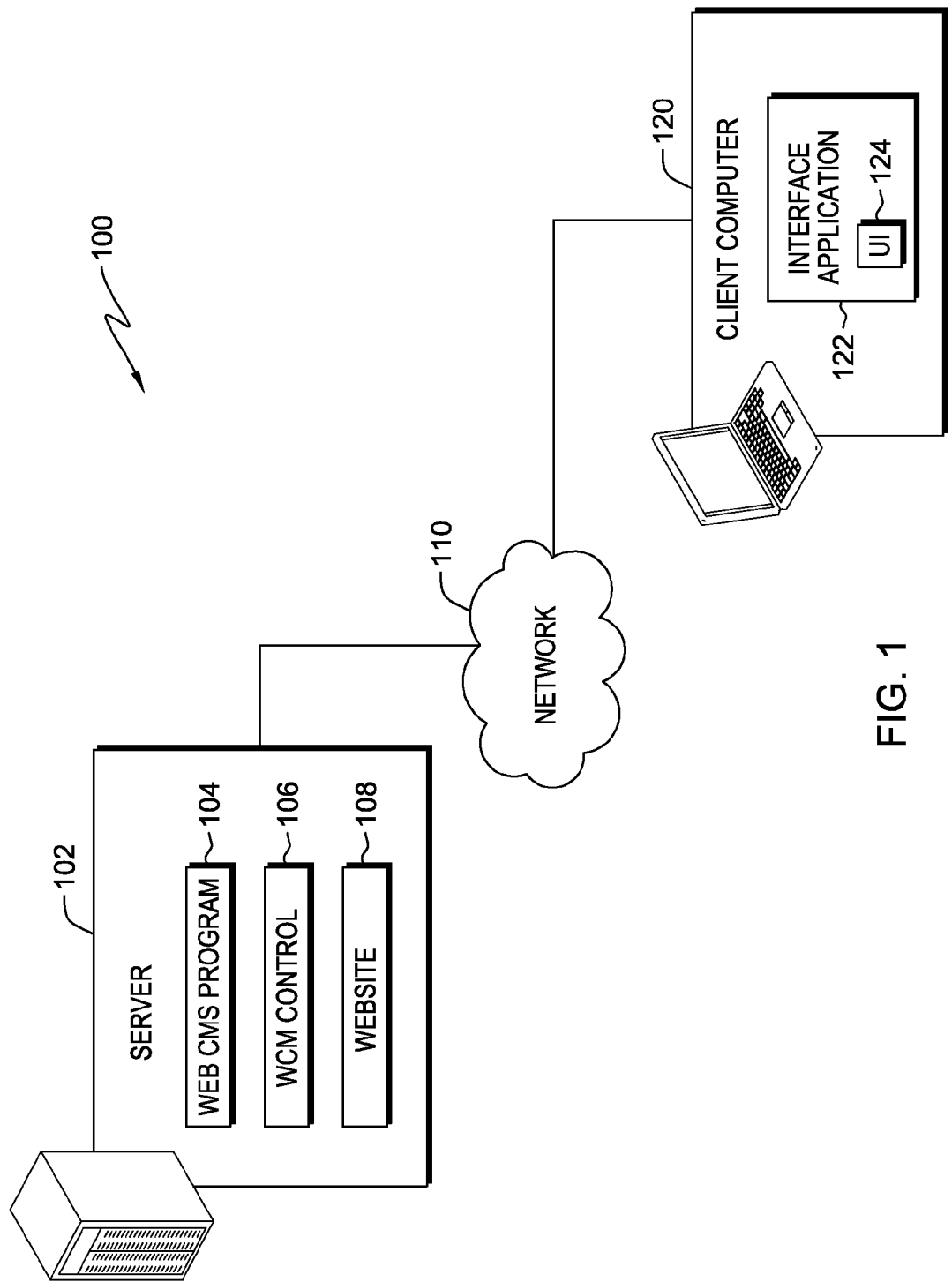
FIG. 1 is a functional block diagram illustrating a distributed computing environment, in accordance with an embodiment of the present invention where a server is hosting a website and Web CMS software employed to maintain the website. The Web CMS software provides a website author/manager the capability to engage in inline editing of a website.

As webpages become more complex yet tailored to optimally display on different computing devices, content management is critical to a website manager. Viewers of a website expect timely updates to content items, such as the news, sporting results, weather reports, new product offerings, and special promotions. At the same time, other elements within the webpages of a website may constrain some content changes. For example, areas of a webpage may be reserved for banners, paid advertisements, or stock tickers. Inline editing is a key tool in Web CMS software. Inline editing shows the website author/manager how the content changes will be displayed for the current page on a specific computing device. It is important for the website author/manager to review each instance where the website reuses the modified content element or structural element so that the change is visually appropriate. For example, replacing one picture with another may display properly on the initial webpage, but if the pictures have different formats on a subsequent webpage, the new picture may become cropped, losing an important part of the content, instead of scaling to fit the available area. Similarly, the layout of content on other types of computing devices can affect the visual appearance of the updates published by the website author/manager (herein identified as the user).

Embodiments of the present invention recognize that providing a user, when updating and maintaining a website, the capability to identify webpages that use the same content element or structural elements that correspond to a change from a user can lead to an improvement in efficiency, and a reduction in errors displaying content. In an example embodiment, an additional, reusable structure (herein defined as "display type") is designed to aggregate content elements or define "placeholders" to be filled by content elements. One or more "display types" may be embedded within a template for a webpage. Display types facilitate identification of locations within the website of other instances of content affected by the changes the user made. In another embodiment, a template may "pull" specific content elements to display based on the context or location of an active display type. In a further embodiment, the display type is capable of a status of "active" or "inactive" within a template for a webpage, thereby allowing a user to reduce the number of templates required by a website. Additional embodiments may provide the ability to change the status of a display type by detecting the device class and automatically optimizing the webpages for the device class. Yet other embodiments may trigger changes of the display types at the applications level by analyzing metadata and application attributes. For example, a user may have different text size or viewing area preferences set for different web browser applications. In another example, a user may only have a 14" screen on the user's laptop; however, when the laptop is docked, the user has a 21" wide screen display providing increased area and resolution for the web browser, which in response may allow additional content to be presented and higher resolution graphics instead of compressed thumbnails used to present pictures.

Embodiments of the present invention render and emulate webpages, displaying the webpages as a visitor sees the webpages on a different device class (e.g., a laptop, a tablet, a smartphone, etc). Emulation capability provides the website manager or user the ability to preview webpages associated with the modified content or display elements on a single display.

The present invention will now be described in detail with reference to the Figures. FIG. 1 is a functional block diagram illustrating distributed data processing environment 100, in accordance with one embodiment of the present invention. An embodiment of distributed data processing environment 100 includes server 102 and client computer 120 interconnected over network 110. Many modifications to the depicted environment may be made by those skilled in the art without departing from the scope of the invention as recited by the claims.

Server 102 may be a laptop computer, a tablet computer, a netbook computer, a personal computer (PC), a desktop computer, a personal digital assistant (PDA), a smart phone, or any programmable computer system known in the art. In certain embodiments, server 102 represents a computer system utilizing clustered computers and components (e.g., database server computers, application server computers, etc.) that act as a single pool of seamless resources when accessed through network 110, as is common in data centers and with cloud computing applications. In general, server 102 is representative of any programmable electronic device or combination of programmable electronic devices capable of executing machine readable program instructions and communicating with client computers, such as client computer 120 via network 110. Server 102 may include components as depicted and described in further detail with respect to FIG. 4, in accordance with embodiments of the present invention.

Server 102 includes Web content management software (Web CMS) program 104, hosts website 108, web content management (WCM) control 106, and other data resources (not shown). Web CMS program 104 may include the capability to publish, edit, and modify content and structural elements as well as perform website maintenance from a central interface. For example, website maintenance includes fixing broken URLs, changing storage requirements, renewing certificates, etc. Web CMS program 104 provides the ability to configure and publish the appropriate presentation for web content associated with a website/webpage which a visitor requests.

Server 102 stores a plurality of data resources (e.g., html files, documents, pictures, audio-clips, icons, and other types of content and control files) that are associated with and support website 108. In one embodiment of the present invention, server 102 hosts website 108 and stores WCM control 106. Web CMS program 104 utilizes WCM control 106 to provide the user checklists and allows users to update and maintain website 108. Web CMS program 104 formats the content and structural elements via templates and other formatting functions to present website 108 in configurations optimized for various device classes (e.g., PC monitor, tablet, smartphone, kiosk, etc.). In another embodiment, content used within website 108 is obtained by server 102 through network 110 from a plurality of sources (not shown). For example, news may be sourced from various media outlets, information from on-line versions of periodicals, videos from social networking sites, financial analysis from investment blogs, etc.

In an embodiment, WCM control 106 is a group of controls including presentation controls and administrative controls. In one embodiment, the presentation controls include structural items (e.g., architecture of the webpage), actual rendering level (e.g., displayed image size), and virtualize rendering (e.g., show work as it may appear on a different display). Administrative controls include authorship permission levels, checklists, preview level, analysis level, and notifications messages. For example, the owner of server 102 may add a checklist of mandatory items to WCM control 106, which the user reviews prior to publishing the changes to website 108. In another example, an authorship level associated with a user allows content changes but restricts modifying structural elements of website 108.

Website 108 is an example of a multi-page website comprised of a variety of elements (e.g., buttons, banners, text boxes, frames, input areas, etc.) and content types (e.g., text, numerical data, streaming-video, audio-clips, photo galleries, advertisements, etc.). For example, website 108 may be an e-commerce website supporting a sporting goods store. In this example, webpages within website 108 are grouped by sport (e.g., physical fitness, golf, fishing, outdoor activities such as kayaking and rock climbing). Webpages within a group are clustered by items that may be sorted by price, popularity, satisfaction rating, or manufacturer. Customers are allowed to write reviews of products that the customers have purchased and then rate their satisfaction level for the purchased product. In this example, the satisfaction rating system is structured, and the website manager or e-commerce storeowner only needs to intervene if abuse is reported. However, if customers are allowed to upload videos of their experience using an item, the videos are not immediately released. The e-commerce storeowner or the website manager reviews the videos before being linked to the associated product. Website 108 is subject to continual small updates and larger modifications driven by seasonal changes.

In one embodiment, client computer 120 and server 102 communicate through network 110. Network 110 can be, for example, a local area network (LAN), a telecommunications network, a wide area network (WAN) such as the Internet, or any combination of the three, and can include wired, wireless, or fiber optic connections. In general, network 110 can be any combination of connections and protocols that will support communications between server 102 and client computer 120, in accordance with embodiments of the present invention.

In various embodiments of the present invention, client computer 120 can be a laptop computer, a tablet computer, a netbook computer, a personal computer (PC), a desktop computer, a personal digital assistant (PDA), a smart phone, or any programmable electronic device capable of communicating with server 102 via network 110. In general, client computer 120 is representative of any electronic device or combination of electronic devices capable of executing computer readable program instructions, in accordance with embodiments of the present invention. Client computer 120 may include components as depicted and described in further detail with respect to FIG. 4, in accordance with embodiments of the present invention.

In one embodiment, client computer 120 executes interface application 122, which can be a web browser, and communicates with server 102 via network 110 to allow a user direct access to an instance of Web CMS program 104. UI 124 is the graphical user interface (GUI) for Web CMS program 104, which a user of Web CMS program 104 utilizes to perform work (e.g., pricing information, content updates, new photo galleries, etc.). Various embodiments may allow a user of client computer 120 to access Web CMS program 104 via a cloud computing application (not shown). In another embodiment, remote desktop emulation software (not shown) communicates with server 102 via network 110 to allow a user access to an instance of Web CMS program 104.

In certain embodiments, interface application 122 is a client version of Web CMS program 104 that executes on client computer 120, communicates with server 102 via network 110, and interacts with the user of client computer 120 via UI 124. In this embodiment, the user updates website 108 by transmitting information between client computer 120 executing interface application 122 (i.e., a client version of Web CMS program 104), and server 102 executing Web CMS program 104. In an example embodiment, data may be transmitted synchronously between client computer 120 and server 102, providing continuous updates supporting website 108 (e.g., pricing information, content updates, new photo galleries, etc.). In another example embodiment, data communications may be asynchronous when interface application 122 periodically transmits or retrieves data, or the communication is manually initiated by the user via UI 124.

Figure 2:
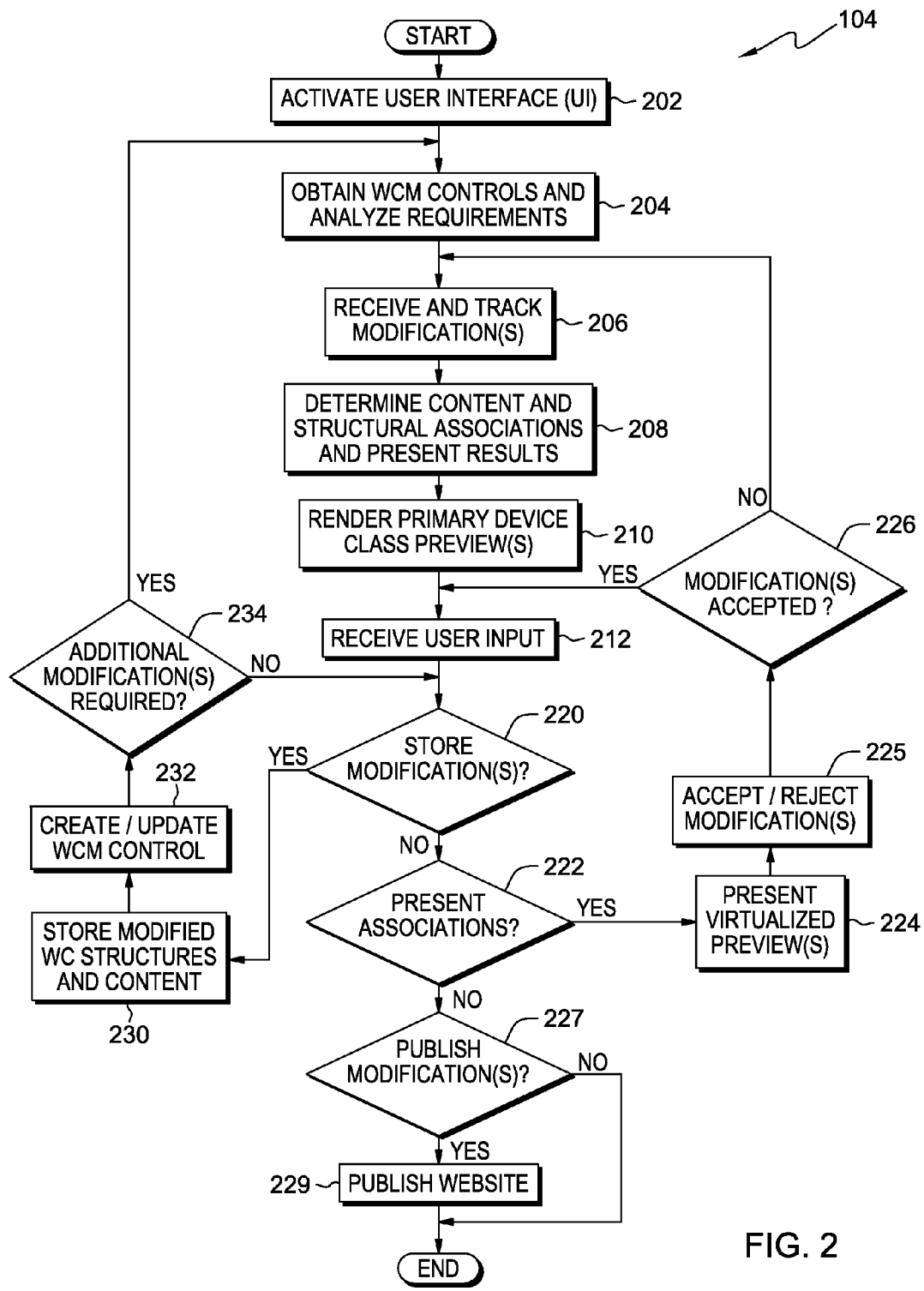
FIG. 2 is a flowchart depicting operational steps of a Web CMS program within the data processing environment of FIG. 1 for previewing modifications to a webpage and viewing the effects of that modification on associated webpages, in accordance with an embodiment of the present invention. The Web CMS program provides the capability to emulate how these webpages are displayed on a plurality of computing devices.

FIG. 2 is a flowchart depicting operational steps of Web CMS program 104, a program for modifying webpage content and structural elements and previewing the modifications on associated webpages containing the modified content or modified structural elements. Web CMS program 104 may virtualize the modifications, emulating the displays on plurality of computing devices, in accordance with an embodiment of the present invention.

In step 202, Web CMS program 104 activates UI 124. More specifically, in response to receiving a login request from interface application 122 executing on client computer 120, Web CMS program 104 activates UI 124. For example, a user selects a website to modify via UI 124, in this case website 108. Alternatively, the user browses a webpage within website 108 and submits a login request via interface application 122 to access Web CMS program 104. In one embodiment, Web CMS program 104 responds and activates a pop-up window containing UI 124. UI 124 transmits the interactions between Web CMS program 104 and the user (e.g., inline edits, function selections, program messages, visual depictions, content information, etc.).

In step 204, Web CMS program 104 obtains WCM control information (e.g., WCM control 106) associated with website 108 from server 102 and analyzes WCM Control 106 to determine requirements that correspond to website 108 (e.g., presentation controls, administrative controls, etc.). In an embodiment, the user may predefine aspects of the website 108 editing and review process that are not preset by a WCM control 106 while accessing website 108 (e.g., inline editing is WYSIWYG (what you see is what you get) mode, device type areas are bounded by dashed blue lines, content element areas are outlined in red, etc.).

In one embodiment, WCM control 106 includes presentation controls and administrative controls to be reviewed by the user and verified by Web CMS program 104 prior to publishing website 108. Presentation controls may include structural items (e.g., highlight display type areas, templates, breakpoints, device classes, API specifications, etc.), actual rendering level (e.g., full page, zoom percentage, current block, current element, etc.), and virtualize renderings (e.g., proposed new layout, emulate one or more device classes, etc.). Administrative controls may include authorship permission levels, checklists (e.g., mandatory items, webpages sponsors, locations of external content, etc.), preview level (e.g., current view, active associated views, unassigned associated views, etc.), analysis level, and notifications (e.g., warning messages, lists, modification tracking, etc.).

Web CMS program 104 analyzes WCM control 106 to identify the requirements associated with editing and updating website 108. In one embodiment, Web CMS program 104 presents a user with a checklist of items associated with updating content or structural elements and publishing website 108. In another embodiment, some instances of WCM control 106 configure functions or aspects of Web CMS program 104 executing in the background while the user is editing and updating website 108. For example, a WCM control 106 sets a fixed number of modifications to content or structural elements, or a fixed number of webpages that can be modified, after which the user is required to preview the changes. A different instance of WCM control 106, for example, defaults inline editing to occur in a "full screen" view. In an additional embodiment, Web CMS program 104 analyzes WCM control 106 to determine requirements that server 102 enforces on modifications made to website 108.

In step 206, Web CMS program 104 receives, via inline editing, at least one instance of new or modified content element or structural element for a display type within website 108. Web CMS program 104 also tracks the one or more modifications performed by a user. In one embodiment, the user selects a webpage or an element from a webpage of website 108 to modify, and the user selects a primary device class to depict the results of the inline editing for that selected primary device class (e.g., a laptop, a tablet, a smartphone, a kiosk, etc.). For example, the modified content is a promotional header (a single element), which originally said "This Saturday and Sunday only . . . ", and the user changed to "Sale prices good through Wednesday . . . " and selects the primary device class as "smartphone". Other aspects of the content are subject to editing (e.g., color, font, etc.). In another embodiment, Web CMS program 104 allows modifications to the layout, composition of content, and content elements within a display type if the user has the required authorship permission level.

In other embodiments, Web CMS program 104 tracks the one or more modifications received from the user for subsequent virtualizations. The virtualizations permit the user to see which, if any, modifications interfere with one another. Modification tracking may also include identification data (e.g., user name, edit time & date, published time & date, completion of administrative control, etc.). In another embodiment, Web CMS program 104 tracks the modification(s) which allows the user to, for example, defer working on website 108 and return later to complete the modifications and preview the modifications.

In other embodiments, the modification of website 108 may include multiple elements of website 108, or the modifications may expand to increasingly complex structures within website 108, up to and including a change to a template or a webpages. In one embodiment, in response to receiving an indication from a user via UI 124 that a current modification is complete, Web CMS program 104 tracks modification(s) for analysis. In another embodiment, in response to the user proceeding to another content item or structural element modification, Web CMS program 104 tracks modifications for analysis. If an instance of WCM control 106 sets a fixed number of modifications (in step 204), then Web CMS program 104 can restrict the user from initiating further modifications until the user reviews at least a portion of the affected webpages.

In step 208, Web CMS program 104 determines which additional webpages within website 108 are affected by a content element or structural element modification(s) based on the primary device class selected and presents the results to the user. In one embodiment, Web CMS program 104 determines if a content element or structural element modification is embedded within a "display type". In response to determining that a content element or structural element modification is embedded within a display type, Web CMS program 104 searches for each instance of the display type containing the modification within the webpages of website 108. Web CMS program 104 maps, within each webpage, the location for each instance of the modification. The locations provide Web CMS program 104 the information to identify for the user the number and position of occurrences of the modification for each webpage associated with the modification. In another embodiment, Web CMS program 104 analyzes the display types associated with website 108 and inspects the display types, identifying the display type containing at least one instance of the modification. In response to identifying one or more addition display types that contain the modified content element or structural element, Web CMS program 104 maps the additional locations for the other instances of the modification. In yet another embodiment, an instance of WCM control 106 may require a more in depth analysis to identify and map the location of each instance of content element or structural element modification. For example, an instance of WCM control 106 may require a code level analysis of the HTML code for each webpage searching for the picture file "NYstateStadiumL005pic1204.jpg".

In one embodiment, Web CMS program 104 determines webpages of website 108 that include data associated with the modification, and Web CMS program 104 presents the user a list of the determined webpages. For example, Web CMS program 104 analyses coding of website 108 to identify which webpages include associations to the modified element of website 108. In another embodiment, if modification is unique, Web CMS program 104 displays a message (e.g., "No Associated Views (NAV)"). In yet another embodiment, Web CMS program 104 presents the user a "change review page". The change review page is an array of thumbnail depictions of the webpages affected by one or more modifications along one axis and ordered by modifications along a different axis. In other embodiments, the affected webpage list or array may include summary information identifying the total number of modifications within a webpage and the modification information (e.g., element name, display type, template). Some embodiments allow the user to pre-select the order of webpages for Web CMS program 104 to render for the primary device class (step 210) from a list of modifications. For example, the user previews the affected webpages starting with the most frequently visited webpage and ending with the least frequently visited webpage. In a different example, the user selects a webpage and previews the page based on device class, starting with the most common device. Alternatively, the order of device class preview may be based on the "hits" for a webpage for each device class.

In step 210, Web CMS program 104 renders a preview for each modification created by the user in a format corresponding to the primary device class. The preview area is at least a portion of the webpage containing the modification. In one embodiment, the size of the preview area is based on user input or an instance of WCM control 106. For example, the preview area may be a full-page view, a 200 percent zoom, or the area of the display type. In another embodiment in a subsequent iteration, the primary device class is changed and one or more previews of the modifications is reviewed at step 210. For example, the user determines from a virtual preview for a smart phone (in step 224) that certain modifications do not display properly. The user chooses not to accept the changes (no branch, decision 226), and changes the primary device class to smartphone and re-inputs the modifications. In this example, Web CMS program 104 displays to the user the results of the inline editing in a format corresponding to a smartphone.

Various embodiments permit Web CMS program 104 to provide previews of multiple modifications to website 108. For example, Web CMS program 104 displays a listing of modifications for a specific webpage to the side of the preview area, and the user selects the modifications to display simultaneously. The user may identify the modifications that, when combined, form a unified presentation to use as a reference prior to publishing the webpage.

In step 212, Web CMS program 104 receives input from the user. In one embodiment, Web CMS program 104 utilizes the input in subsequent steps; for example, to trigger decisions, store modifications, combine modifications to present a composite rendering, satisfy administrative control requirements, or adjust the preview area. For example, the user may select one or more device classes for Web CMS program 104 to virtualize for previewing and identify which combination of modifications Web CMS program 104 previews at step 224. In another example, the user completes an initial round of modifications, accepts the previews, and is ready to store the modifications, but defers publishing the changes. The user may preset the collective states of decisions 220, 234, 222, and 227 to automatically store the user's completed work and allow the user to exit Web CMS program 104 at any time rather than respond to individual decisions steps.

In step 220, Web CMS program 104 determines whether to store the modification for at least one content or structural change. In one embodiment, Web CMS program 104 is going to store the modifications and/or if Web CMS program 104 is going to update WCM control 106. The user may add further modifications to the primary device class webpages via the yes branch of decision 220. In another embodiment, Web CMS program 104 receives an indication whether the user is previewing the webpages associated with the modification(s), publishing the modification(s), or leaving Web CMS program 104 triggering the no branch of decision 220.

In an example embodiment, if the user indicates (via input from step 212) that the appearance of a modification for the primary device class is satisfactory and that modifications of website 108 currently do not need to be stored (no branch, decision 220), then Web CMS program 104 determines whether to present the webpages associated with the modification (yes branch, decision 222). Alternatively, in another embodiment, if Web CMS program 104 determines that the modification(s) are acceptable (e.g., were previewed as required by WCM control 106 and were stored (step 230)), then Web CMS program 104 defaults decision 220 and decision 222 to their respective "no" branches allowing the user to publish the completed portion of website 108 or exit Web CMS program 104.

In step 222, Web CMS program 104 determines whether to present associated webpages affected by the modification(s) to the user. In one embodiment, Web CMS program 104 receives an indication that the modifications of website 108 are completed, stored, and/or administrative requirements (WCM control 106) finalized, and no further presentation of associations is needed (no branch, decision 222). Subsequently, the user elects to publish website 108. In another embodiment, the user may provide an indication via UI 124 to Web CMS program 104 to store the work done (e.g., modifications and administrative requirements (WCM control 106) (initially via the yes branch, decision 220), to skip the preview of the associated webpages (no branch, decision 222), and to exit the program. If Web CMS program 104 determines that the administrative requirements of WCM control 106 are incomplete, then website 108 is not published (no branch, decision 227).

In step 227, Web CMS program 104 determines whether to publish modifications. In an example embodiment, if website 108 requires further modifications or updates corresponding to an instance of WCM control 106, then the user may provide an indication to Web CMS program 104 via UI 124 to not publish the modification for website 108 (no branch, decision 227). If, however, Web CMS program 104 determines that the user has not saved the modification(s), Web CMS program 104 warns the user and awaits the user's response. If the modification(s) were saved, then Web CMS program 104 ends. In another embodiment, if the modifications for website 108 are complete, or a portion of the modifications or previews are sufficient to satisfy administrative requirements of WCM control 106, the user may provide an indication to Web CMS program 104, via UI 124, to publish the modification(s) (yes branch, decision 227).

In step 229, Web CMS program 104 publishes website 108. In one embodiment, the user identifies, via UI 124, the portion of website 108 to publish, and Web CMS program 104 publishes the identified portion of website 108 if WCM control 106 requirements are satisfied. In another embodiment, Web CMS program 104 determines which modifications satisfy the requirements within WCM control 106 and publishes the webpages containing modifications that satisfy the requirements. In yet another embodiment, WCM control 106 may require version tracking to activate. For example, Web CMS program 104 saves a pre-modification copy of website 108 as a back-up prior to publishing the modified version of website 108.

Looking back to decision 222, in one embodiment, if Web CMS program 104 determines that the administrative requirements (WCM control 106) for previewing are incomplete, then Web CMS program 104 (via the yes branch, decision 222) presents the webpages associated with the modification(s) (step 224). In another embodiment, the user inputs other device classes to be previewed (in step 212), and Web CMS program 104 determines the webpages affected by modification(s) corresponding to the selected device class. In yet another embodiment, if the user provides an indication to Web CMS program 104 (via input from step 212) to preview combinations of modifications, then Web CMS program 104 presents the webpages associated with the combinations of modifications (yes branch, decision 222).

In step 224, Web CMS program 104 presents one or move virtualized previews of webpages associated with the modification(s) to the user. In one embodiment, the received user input (step 212) designates to Web CMS program 104 the order in which to present the associated webpages. For example, the order may be, hierarchical based on the number of modifications per page, presenting webpages with active content first and presenting webpages with hidden or inactive content last. In some embodiments, Web CMS program 104 can provide visual clues to identify which webpages have been previewed (e.g., a check mark next to an item of a list, a colored boarder around a thumbnail, a thumbnail replaced by an icon, etc.). In another embodiment, Web CMS program 104 can regulate various aspects of the virtualized preview(s) by at least one instance of WCM control 106. For example, the preview area is at 200 percent zoom, associated webpages are presented one page for each device class defined for an instance of WCM control 106, and the previews are displayed side-by-side for comparison.

In step 225, Web CMS program 104 identifies, based on user input, which previewed modification(s) are accepted and which previewed modification(s) are rejected. In one embodiment, the user responds to the one or more virtualized previews created by Web CMS program 104 (step 224) through controls available within UI 124 to provide an indication of whether to accept or reject the modifications. In another embodiment, the user may select a modification to reject and press "delete" on the keyboard. For example, based on predefined preferences, the modification may be eliminated and Web CMS program 104 identifies the area of the modification with a dashed box indicating that a different display type is required to display the content properly.

In decision 226, Web CMS program 104 determines which modification(s) were accepted and which modification(s) were rejected. In an example embodiment, if the user accepts one or more modification changes (yes branch, decision 226), then Web CMS program 104 queries the user via UI 124 and awaits further input (step 212). Alternatively, if the user does not accept the previewed modification, Web CMS program 104 returns the user to the inline editor to rework the modification(s) (step 206). In another embodiment, an instance of WCM control 106 allows a mix of accepted and rejected modifications to be input via UI 124. Subsequently, decision 226 proceeds along the "no" branch to permit the accepted modification(s) to be tracked and the rejected modification to undergo further inline editing to rework issues seen during the virtualized previews (step 224). In yet another embodiment, initial user input at step 212 indicates to Web CMS program 104 that the user set a preference that stores the modification(s) (in step 230) as the modification(s) are accepted (in step 225). In this example, Web CMS program 104 switches decision 220 to the "yes" branch when modification(s) are accepted and decision 220 to the "no" branch when reworked, rejected modification(s) occur and are subsequently previewed, returning to decision 226.

For example, if some modifications to website 108 have not been reviewed, and the user decides to activate the emulation of another device class (e.g., tablet PC) and preview the accepted modifications as displayed by that device class, then Web CMS program 104 queries the user and awaits further input (step 212).

If the user does not accept a modification (no branch, decision 226), Web CMS program 104 waits for the user to re-edit the modification or replace the modification with a different modification (step 206).

Looking back to decision 220, Web CMS program 104 determines whether user input from step 212, an instance of WCM control 106, or a combination thereof controls whether or not the modification(s) are stored. The modification(s) may include, the entirety of website 108, a single webpage, a template, or a group of one or more elements of website 108. In an example embodiment, if the administrative requirements of an instance of WCM control 106 are satisfied and the user previewed each modification, Web CMS program 104 determines to store the modification(s) (yes branch, decision 220). In another embodiment, initial user input at step 212 indicates to Web CMS program 104 that the user set a preference to store the modification(s) as the modification(s) are accepted. In this example, Web CMS program 104 switches decision 220 to the "yes" for the accepted modification(s) and Web CMS program 104 sets decision 220 to "no" and decision 222 to "yes" when the rejected modification(s) need further changes and are to virtualized for previewing, returning to decision 226.

In step 230, Web CMS program 104 stores the accepted modification(s) (e.g., content, web content (WC) structures) on server 102. In one embodiment, an instance of WCM control 106 may require version control thereby indicating a naming convention that facilitates version tracking. In another embodiment, an instance of WCM control 106 automatically names the modification(s) without further input from the user.

In step 232, Web CMS program 104 creates one or more new instances of WCM control 106 or updates one or more current instances of WCM control 106. In one embodiment, Web CMS program 104 reviews an instance of a current WCM control 106 and determines if the user has the appropriate authorship permission level. For example, the user may have update authorship permission for a subset of the current instances of WCM control 106 but lacks permission to create an instance of WCM control 106. In this example embodiment, Web CMS program 104 can publish the content and structure modifications governed by the subset of instances of WCM control 106. However, Web CMS program 104 does not publish the content and the structures that require a new WCM control 106 or the instances of WCM control 106 not within the subset of current instances of WCM control 106. In this example, the user would have to seek out another user having the appropriate authorship permissions to complete the remaining portion of the updates and finish publishing website 108. In a different embodiment, the administrator of server 102 defines a high level instance of WCM control 106, and the user can create and update other instances of WCM control 106 as long as the instances of WCM control 106 conform to the requirements set forth by the administrator's high level WCM control 106.

In decision 234, Web CMS program 104 determines if additional modification(s) to content or WC structures are required. In one embodiment Web CMS program 104 reviews the inputs from one or more instances of WCM control 106 and previous user inputs to determine whether additional modification(s) are required. In one example embodiment, the user has not satisfied at least one instance of WCM control 106 required to publish website 108 but indicates via UI 124 that the user wants to cease work on website 108. Web CMS program 104 determines that decisions 220, 222, 227, and 234 are set to "no", and the current instance of Web CSM program 104 ends.

In another embodiment, an instance of WCM control 106, or a user input, directs Web CMS program 104 to pause at decision 234 and await input from the user via UI 124. For example, the user has completed and previewed the modification(s) for the primary device class and stored the modification(s). The user selects a control function from UI 124 and indicates that no additional modification(s) are required (triggering no branch, decision 234) and selects a different device class to preview. Then Web CMS program 104 determines that decision 220 is set to "no" and decision 222 is set to "yes". Web CMS program 104 presents the virtualized previews of the modification(s) using the selected different device class (in step 224). In a different example, the user indicates, via UI 124, that the user's work is complete and for Web CMS program 104 to publish website 108. Web CMS program 104 verifies that the requirements governing publishing website 108 within WCM control 106 are satisfied. Web CMS program 104 sets decisions 220, 222, and 234 to "no" and decision 227 to "yes". Web CMS program 104 publishes website 108, and the current instance of Web CMS program 104 ends.

If Web CMS program 104 determines that additional modification(s) are required, or the user indicates via UI 124 that additional modification(s) are required, then decision 234 proceeds along the "yes" branch. In one embodiment, the user is working on one webpage within website 108 at a time. The user stores the work for an initial webpage (step 230) and decides to modify a next webpage (yes branch, decision 234). Web CMS program 104 checks if the next webpage has the same WCM control 106 requirements as the initial webpage (step 204). Herein, the user repeats one or more of the steps used to edit and preview initial webpage on subsequent webpages until all modifications are complete and Web CMS program 104 can publish website 108.

Figure 3:
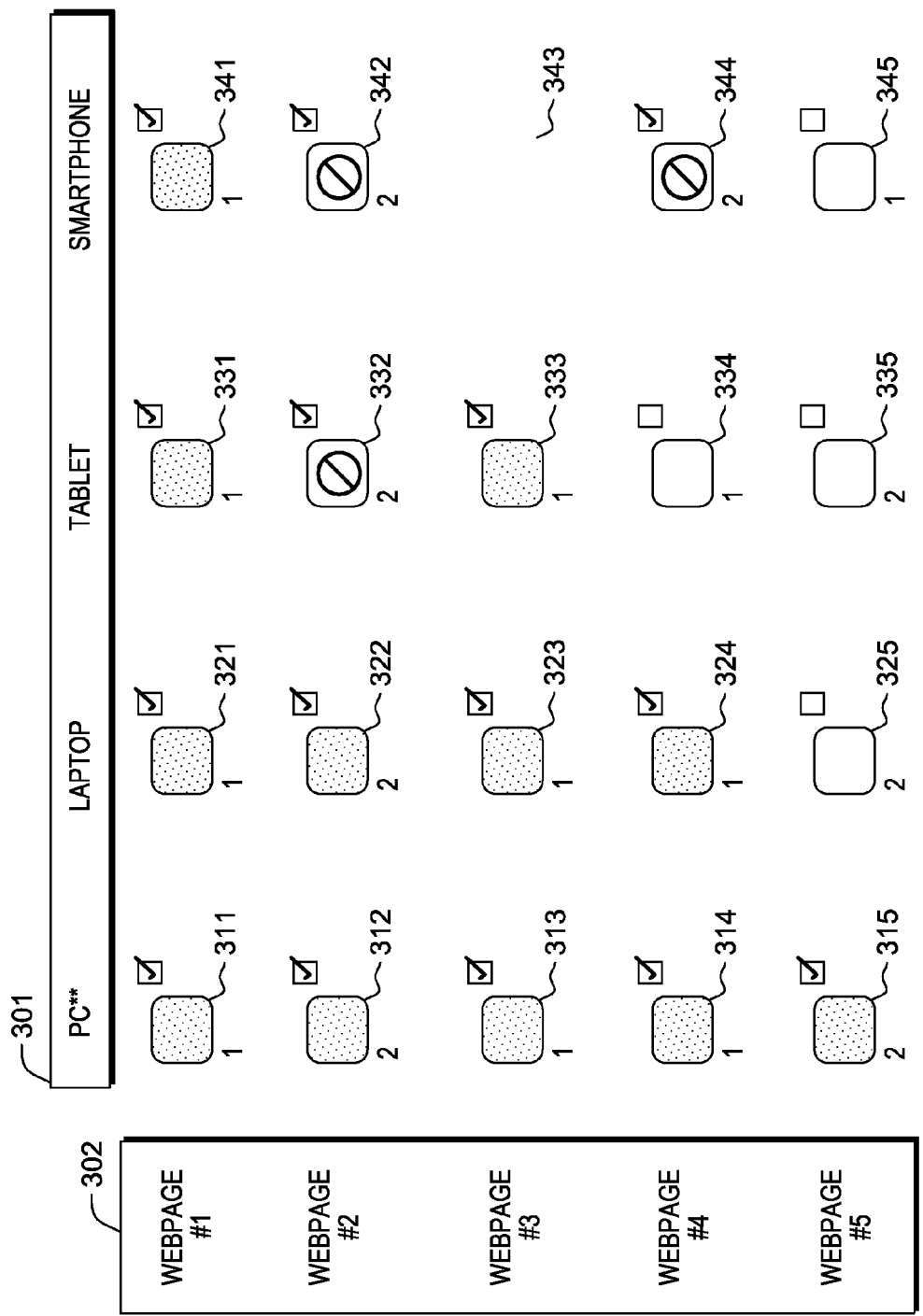
FIG. 3 is an illustrative example of a modification review page. The modification review page is an array of thumbnail depictions, generated by Web CMS 104, of webpages affected by inline editing across a range of display classes, in accordance with an embodiment of the present invention.

FIG. 3 is an illustrative example of a modification review page, in accordance with an embodiment of the present invention. The modification review page is an array of thumbnail image depictions generated by Web CMS program 104 of webpages affected by inline editing across a range of display classes. The array may be generated utilizing preset user preferences through user input from step 212.

In this illustrative embodiment, user preferences define how Web CMS program 104 presents the virtualized previews (created in step 224) of modifications made to website 108. In this example, list 302 identifies webpages within website 108 to preview. The user identified that webpages #1, #2, #3, #4, #5 are to be presented in vertical axis in the order depicted and that list 302 is positioned to the left of the modification review page.

The user identified that the position of the device classes presented is at the top of the modification review page. In list 301, the first device class is a PC (personal computer) and the "\*" designation identifies the PC device class as the primary device class. List 301 depicts three additional device classes for Web CMS program 104 to preview. The four device classes to be previewed are PC (personal computer), Laptop (laptop computer), Tablet (tablet computer), and Smartphone.

Thumbnail image 311 is an example depiction of the thumbnail structure used in an embodiment of a modification review page. For example, to select a fully rendered and emulated webpage the user would "double left click" the mouse pointer on the desired webpage thumbnail image. In one embodiment, Web CMS program 104 places the modification review page in the background of the monitor of client computer 120 and renders and emulates the selected webpage in full-screen view. In another embodiment, Web CMS program 104 detects that client computer 120 has dual monitors. In this embodiment, the modification review page remains visible on one monitor, and the selected webpage is rendered and emulated on the other monitor.

In another embodiment, the thumbnail structure includes a rounded square area that indicates a webpage, which may be miniature version of the rendered webpage. In yet another embodiment, the elements are represented by colored boxes with solid fill, and the modified element is represented by a dashed area without fill. In this example embodiment, the user may perceive an overlapping of elements signifying that further modifications may be needed to the webpage to correct the overlapping elements. The user selects the thumbnail image for the affected webpage presenting the webpage as a larger view and verifying whether the elements are actually overlapping and needing further modifications.

In the example depiction of a thumbnail structure in thumbnail image 311, another item is a "number of elements modified" indicator in the lower left corner. The other item within the thumbnail structure is a checkbox. The checkbox indicates to Web CMS program 104 that the user identifies that this webpage and the one or more modifications was previewed.

In one example embodiment, the user "right clicks" on the rounded square area of a thumbnail image to display a "mini-menu". The mini-menu may include at least an "accept" command and a "reject" command. For example, if a preview webpage is accepted, the rounded square area of a thumbnail image is overlaid with a transparent, grey highlight. In a different embodiment the "accept" indication may be a "shadow" or "glow" around the perimeter of the rounded square area of a thumbnail image.

Thumbnail image 332 depicts an example of a "reject" indication. In one embodiment, the reject indication is depicted as a circle with a diagonal line as seen in the center of thumbnail image.

"PC" is the first item in list 301 and is identified as the primary device class. Thumbnail images 311, 312, 313, 314, and 315 depict the respective webpages in list 302, webpage #1, webpage #2, webpage #3, webpage #4, and webpage #5 rendered for the device class "PC". In the illustrated depiction, the webpages previewed and accepted by the user having one modified element are webpage #1 (thumbnail image 311), webpage #3 (thumbnail image 313), and webpage #4 (thumbnail image 314). In the illustrated depiction, the webpages previewed and accepted by the user having two modified elements are webpage #2 (thumbnail image 312) and webpage #5 (thumbnail image 315).

In this example embodiment, after previewing and accepting webpages #1, #2, #3, #4, and #5 for the primary device class (i.e., PC), the user previews a webpage for each additional device class (i.e., laptop, tablet, and smartphone). The user has previewed and accepted webpage #1 for device classes Laptop (thumbnail image 321), Tablet (thumbnail image 331), and Smartphone (thumbnail image 341).

The user has accepted and previewed webpage #2 for device class Laptop (thumbnail image 322). The user has rejected and previewed webpage #2 for device class Tablet (thumbnail image 332) and Smartphone (thumbnail image 342).

The user has accepted and previewed webpage #3 for device class Laptop (thumbnail image 323) and Tablet (thumbnail image 333).

In this example embodiment, the lack of thumbnail image 343 indicates that website 108 does not display webpage #3 when viewed on a smartphone.

Thumbnail image 324 indicates that the user has previewed and accepted webpage #4 for the device class Laptop. For example, the user notes that the device class Smartphone for webpage #4 (thumbnail image 344) has two "elements modified" whereas thumbnail images 314, 324, and 334 indicate one "element modified". In this example, the user previews thumbnail image 344 prior to previewing webpage #4 for device class Tablet (thumbnail image 334). The user rejects the modifications for webpage #4 for device class Smartphone (thumbnail image 344).

Thumbnail images 325, 335, and 345 indicate that webpage #5 has not been previewed for device classes Laptop, Tablet, and Smartphone. Thumbnail image 345 indicates that webpage #5 has one "element modified" whereas the thumbnail images 315, 325, and 335 indicate that the respective device classes have two "elements modified".

Figure 4:
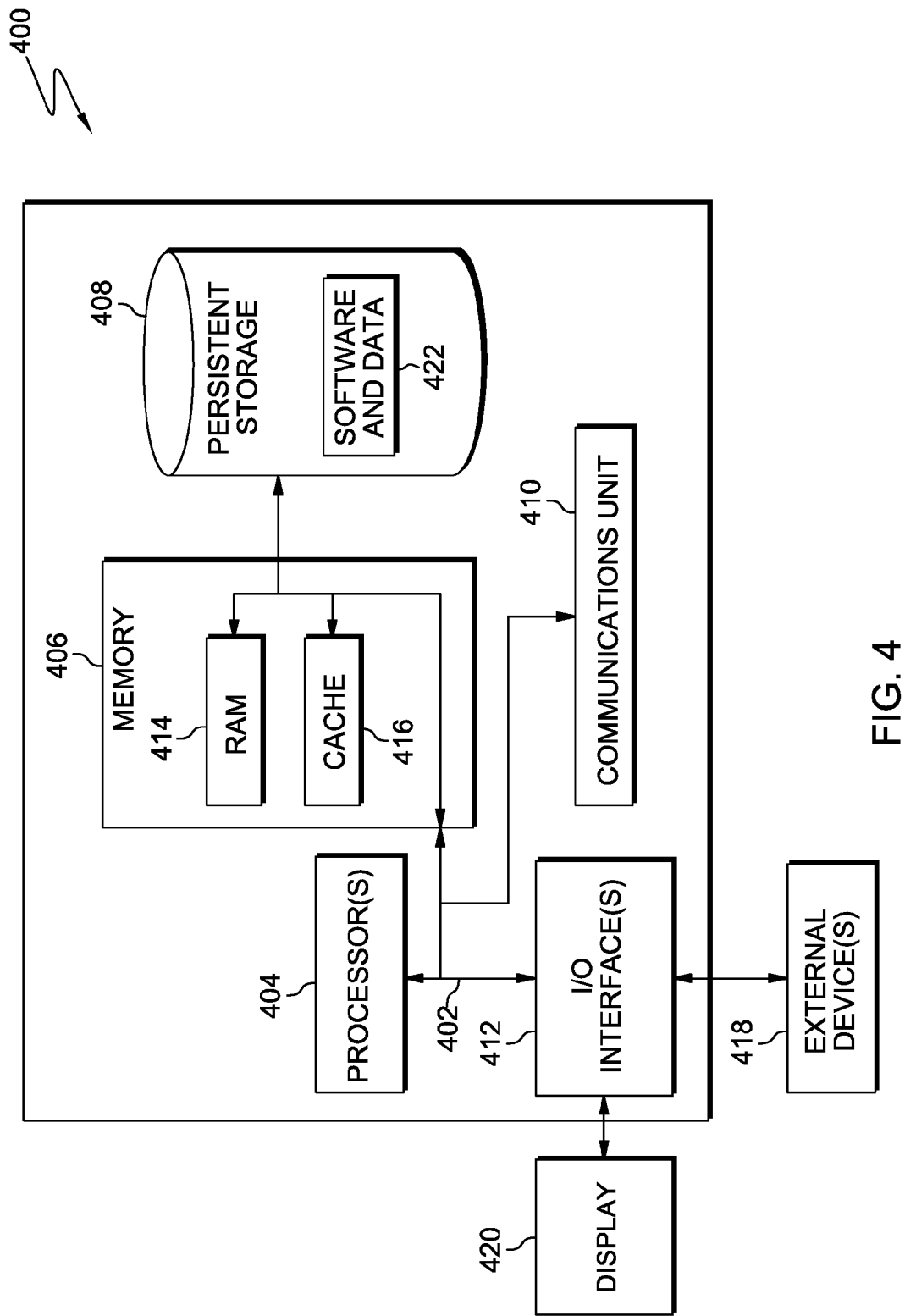
FIG. 4 depicts a block diagram of components of a computing system representative of the client device and server of FIG. 1, in accordance with an embodiment of the present invention.

FIG. 4 depicts a block diagram of components of computer 400, which is representative of client computer 120 and server 102, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media. Software and data 422 are stored in persistent storage 408 for access and/or execution by processor(s) 404 via one or more memories of memory 406. With respect to client computer 120, software and data 422 includes interface application 122 and UI 124. With respect to server 102, software and data 422 includes Web CMS program 104, WCM control 106, and website 108.

In this embodiment, persistent storage 408 includes a magnetic hard disk drive. Alternatively, or in addition to a magnetic hard disk drive, persistent storage 408 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of server 102, network 110, and client computer 120. In these examples, communications unit 410 includes one or more network interface cards. Communications unit 410 may provide communications through the use of either or both physical and wireless communications links. Software and data 422 may be downloaded to persistent storage 408 through communications unit 410.

I/O interface(s) 412 allows for input and output of data with other devices that may be connected to computer 400. For example, I/O interface(s) 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data 422 used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor. Display 420 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing modifications to elements of a website, the method comprising:
   receiving, by one or more computer processors, input from a user that includes one or more modifications to a first element of a first webpage, wherein the one or more modifications to the first element of the first webpage are input utilizing inline editing software, and wherein the first webpage is a member of a plurality of webpages of a website;
   receiving, by one or more computer processors, from a user, a selection of a set of device classes, the set of device classes corresponds to two or more devices that display an instance of a webpage of the website, wherein the set of device classes includes a first device class associated with the one or more modifications to the first element of the first webpage;
   identify, by one or more computer processors, one or more additional webpages of the plurality of webpages of the website that include one or more instances of the modified first element of the first webpage, wherein the first webpage and each of the identified one or more additional webpages are affected by the one or more modifications to the first element and are respectively associated with different device classes of the received set of device classes;
   determining, by one or more computer processors, locations that correspond the one or more instances of the modified first element within a respective webpage of the identified one or more additional webpages respectively associated with each device class of the received set of device classes;
   generating, by one or more computer processors, an array based, at least in part, on the first webpage and each of the identified one or more additional webpages affected by the one or more modifications to the first element respectively associated with each of the received set of device classes;
   rendering by one or more computer processors, the generated array based, at least in part, on at least a portion of the first webpage and each of the identified one or more one or more additional webpages based on the location of the corresponding instance of the modified first element; and
   displaying, by one or more computer processors, the generated array to the user, wherein the generated array includes a thumbnail depiction of each affected webpage that includes one or more instances of the modified first element and the array further includes an indication of each device class of the received set of device classes along one axis and an indication associated with each affected webpage of the website along another axis.

2. The method of claim 1, further comprising:
   receiving, by one or more computer processors, a selection, input from the user, of a depiction within the generated array; and
   displaying, by one or more computer processors, to the user, at least the rendered portion of an identified webpage affected by the one or more modification of the first element, based on the affected webpage that corresponds to the depiction selected from within the generated array.

3. The method of claim 1, wherein the received one or more modifications to the first element of the first webpage includes one or more modifications to a content element of the first element.

4. The method of claim 1, wherein the received one or more modifications to the first element of the first webpage includes one or more modifications to a structural element of the first element.

5. The method of claim 1, wherein the received one or more modifications to the first element includes a modification to a display type, wherein a display type is comprised of a combination of one or more structural elements and one or more content elements.

6. The method of claim 1, wherein the generated array of thumbnail depictions of the of each affected webpage further include a corresponding numeric value that indicates a number of instances of the modified first element within each of the affected webpage.

7. The method of claim 3, wherein a display type aggregates content elements and includes one or more placeholders related to future content inclusion; and wherein one or more display types are embedded within a template of a webpage.

* * * * *